(No Model.)

H. McCOBB.
CHOCOLATE PACKAGE.

No. 259,887. Patented June 20, 1882.

WITNESSES:
Chas. Nida.
C. Sedgwick

INVENTOR:
H. McCobb
BY Munn & Co
ATTORNEYS.

N. PETERS, Photo-Lithographer, Washington, D. C.

UNITED STATES PATENT OFFICE.

HENRY McCOBB, OF NEW YORK, N. Y.

CHOCOLATE-PACKAGE.

SPECIFICATION forming part of Letters Patent No. 259,887, dated June 20, 1882.

Application filed April 24, 1882. (No model.)

*To all whom it may concern:*

Be it known that I, HENRY McCOBB, of the city, county, and State of New York, have invented a new and useful Improvement in Chocolate-Packages, of which the following is a full, clear, and exact description.

Reference is to be had to the accompanying drawings, forming part of this specification, in which similar letters of reference indicate corresponding parts in both the figures.

Figure 1:
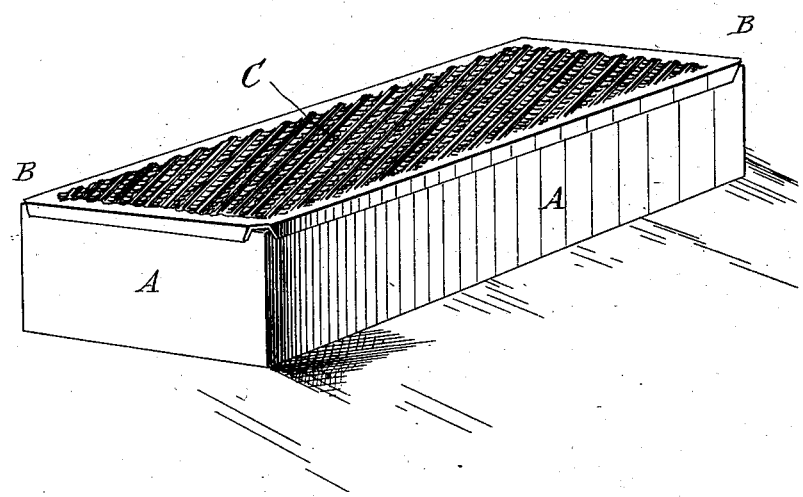
Figure 2:
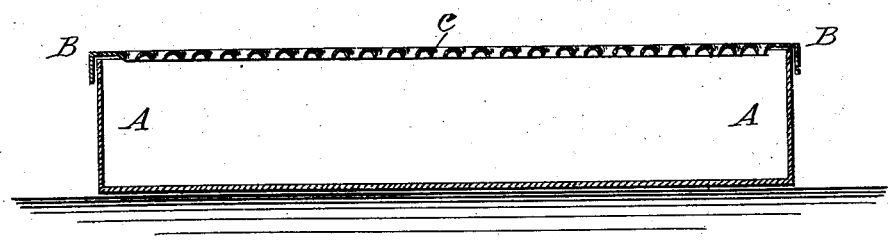

Figure 1 is a perspective view of one of my improved packages. Fig. 2 is a sectional side elevation of the same.

The object of this invention is to promote convenience in preparing chocolate for use.

The invention consists in a box constructed with a sheet-metal body, and having a grater-cover capable of being removed from its position over the body of the box, and then used to grate the material contained in the box, and cause the grated material to fall either outside or inside of the box, as may be desired, whereby the package will always be provided with a grater for preparing the chocolate and for delivering it into a receptacle, as will be hereinafter fully described.

A represents the body of the package, which can be made of decorated tin or of other suitable sheet metal.

B is the cover of the package, which is punctured to form on the under surface a grater, C, upon which the chocolate can be grated when being prepared for use. The chocolate-cakes are wrapped in paper in the ordinary manner, and are then placed in the package. When chocolate is to be used the cover B is taken off the package, and a chocolate-cake is taken out, and is grated upon the grater or rough surface C of the said cover B.

In grating chocolate the grater soon becomes clogged from the sticky nature of the substance, so as to be less effective in use. With my improvement a new grater is provided with each package of chocolate, so that the grater will always be in good working condition.

I have described the package as being used for chocolate-cakes; but it can be used with equal advantage for cocoa and other articles that have to be grated before being used.

Having thus fully described my invention, I claim as new and desire to secure by Letters Patent—

As a new article of manufacture, a box having the body A and the removable grater-cover B C, as shown and described.

HENRY McCOBB.

Witnesses:
JAMES T. GRAHAM,
C. SEDGWICK.